United States Patent
Tang et al.

(10) Patent No.: US 11,222,285 B2
(45) Date of Patent: Jan. 11, 2022

(54) FEATURE SELECTION METHOD, DEVICE AND APPARATUS FOR CONSTRUCTING MACHINE LEARNING MODEL

(71) Applicant: Advanced New Technologies Co., Ltd., George Town (KY)

(72) Inventors: Yuzhou Tang, Hangzhou (CN); Hong Jin, Hangzhou (CN); Weiqiang Wang, Hangzhou (CN); Wenbiao Zhao, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 17/162,939

(22) Filed: Jan. 29, 2021

(65) Prior Publication Data

US 2021/0150415 A1 May 20, 2021

Related U.S. Application Data

(63) Continuation of application No. PCT/CN2019/101397, filed on Aug. 19, 2019.

(30) Foreign Application Priority Data

Oct. 24, 2018 (CN) .......................... 201811244486.8

(51) Int. Cl.
*G06N 20/00* (2019.01)
*G06F 16/28* (2019.01)
*G06F 16/22* (2019.01)
*G06F 16/2457* (2019.01)

(52) U.S. Cl.
CPC .......... *G06N 20/00* (2019.01); *G06F 16/2228* (2019.01); *G06F 16/24578* (2019.01); *G06F 16/285* (2019.01)

(58) Field of Classification Search
CPC ............... G06K 9/6228; G06F 16/254; G06F 16/24578; G06F 16/285; G06F 16/2228
See application file for complete search history.

(56) References Cited

U.S. PATENT DOCUMENTS

| | | | | |
|---|---|---|---|---|
| 2004/0172378 | A1* | 9/2004 | Shanahan | ............. G06F 16/337 |
| 2019/0303719 | A1* | 10/2019 | Hamilton | ............. G06F 16/254 |
| 2020/0118036 | A1* | 4/2020 | Karnagel | ............... G06N 20/20 |

* cited by examiner

*Primary Examiner* — Hau H Hoang
(74) *Attorney, Agent, or Firm* — Shun Yao; Park, Vaughan, Fleming & Dowler LLP (57) ABSTRACT

A feature-selection system obtains a training data set and associated features; divides the training data set into a first number of training data subsets; and forms a plurality of feature-selecting data sets. A feature-selecting data set comprises a second number of training data subsets. The system processes, in parallel, each feature-selecting data set, which comprises: computing a first evaluation index for the features based on the feature-selecting data set; obtaining a group of index ranks corresponding to the features based on the first evaluation index; and obtaining a group of importance ranks corresponding to the features based on the feature-selecting data set and a machine-learning model. The system further obtains a group of total ranks by fusing groups of index ranks and groups importance ranks obtained from processing the plurality of feature-selecting data sets; and selecting target features from the features based on the group of total ranks.

24 Claims, 7 Drawing Sheets

FEATURE SELECTION METHOD, DEVICE AND APPARATUS FOR CONSTRUCTING MACHINE LEARNING MODEL

RELATED APPLICATION

Under 35 U.S.C. § 120 and § 365(c), this application is a continuation of PCT Application No. PCT/CN2019/101397, entitled "FEATURE SELECTION METHOD, DEVICE AND APPARATUS FOR CONSTRUCTING MACHINE LEARNING MODEL," by inventors Yuzhou Tang, Hong Jin, Weigiang Wang, and Wenbiao Zhao, filed 19 Aug. 2019, which claims priority to Chinese Patent Application No. 201811244486.8, filed on 24 Oct. 2018.

TECHNICAL FIELD

One or more embodiments of the present application relate to the field of computer technology, and in particular relate to a feature selection method, device and apparatus for constructing a machine learning model.

BACKGROUND

In order to construct a machine learning model having optimal performance, data analysts and data mining engineers tend to violently derive numerous dimensions of features (also known as variables) according to service experience and understanding of data. However, this process often generates a great amount of redundant and subtle information, which has little value for the desired to-be-constructed machine learning model, and even generates side effects. Therefore, in the process of constructing the machine learning model, we need to continuously carry out tests and carefully perform feature filtering, and finally construct an optimal machine learning model.

For the above-mentioned feature selection process, when it is carried out manually, it is usually very labor-intensive and slows down the speed of model construction, so it is usually carried out automatically. In the conventional technology, there are several automatic feature selection methods, including filter-based feature selection, embedded feature selection, and wrapper-based feature selection. When these feature selection methods are used to filter features, they usually only consider the performance of features on some divided data sets.

Therefore, it is necessary to provide a feature selection method that can filter out more accurate features.

SUMMARY

One or more embodiments of the present application describe a feature selection method, device and apparatus for constructing a machine learning model, which can filter out more accurate features.

In the first aspect, an embodiment provides a method and system for feature selection. During operation, the system obtains a training data set and features associated with the training data set; divides the training data set into a first number of training data subsets; and forms a plurality of feature-selecting data sets. A respective feature-selecting data set comprises a second number of training data subsets, the second number being smaller than the first number. The system processes, in parallel, each feature-selecting data set, which comprises: computing a first evaluation index for the features based on the feature-selecting data set; obtaining a group of index ranks corresponding to the features based on the first evaluation index; and obtaining a group of importance ranks corresponding to the features based on the feature-selecting data set and a machine-learning model. The system further obtains a group of total ranks corresponding to the features by fusing groups of index ranks and groups importance ranks obtained from processing the plurality of feature-selecting data sets; and selecting target features from the features based on the group of total ranks.

In a variation on this embodiment, obtaining the group of total ranks of the features comprises: fusing the groups of index ranks obtained from processing the plurality of feature-selecting data sets to obtain a group of total index ranks; fusing the groups of importance ranks obtained from processing the plurality of feature-selecting data sets to obtain a group of total importance ranks; and fusing the group of total index ranks and the group of total importance ranks to obtain the group of total ranks of the plurality of features.

In a further variation, processing each feature-selecting data set further comprises: computing additional evaluation indices for the features based on the feature-selecting data set; and obtaining additional groups of index ranks corresponding to the features based on the additional evaluation indices.

In a further variation, fusing the groups of index ranks to obtain the group of total index ranks of the plurality of features comprises: for each evaluation index selected from a set of evaluation indices comprising the additional evaluation indices and the first evaluation index: extracting from groups of index ranks association with the set of evaluation indices and the plurality of feature-selecting data sets, a plurality of groups of index ranks associate with the selected evolution index; and performing a first rank fusion operation to respectively fuse corresponding ranks of the features in the extracted plurality of groups of index ranks to obtain a group of comprehensive index ranks corresponding to the selected evaluation index. Fusing the groups of index ranks further comprises performing a second rank fusion operation to respectively fuse groups of index ranks obtained for the set of evaluation indices to obtain the total index ranks of the features.

In a further variation, the first rank fusion operation or the second rank fusion operation comprises one of: a mean operation, a maximum operation, a minimum operation, a weighted average operation and a robust rank aggregation (RRA) operation.

In a variation on this embodiment, dividing the training data set comprises one of: dividing the training data set based on time; and dividing the training data set randomly.

In a variation on this embodiment, the first evaluation index comprises one of: an information value (IV), a Gini coefficient (GINI), an information gain (IG), mutual information (MI), a Relief score, and a sample stability index (PSI).

In a variation on this embodiment, the training data set is divided into k training data subsets, wherein k different feature-selecting data sets are formed, and wherein each feature-selecting data set comprises k-1 training data subsets.

In the second aspect, a feature selection method for constructing a machine learning model is provided, including:

obtaining a training data set;

dividing the training data set in a preset division manner to obtain k groups of training data subsets;

executing, in parallel, the following processes on the k groups of training data subsets for k times:

selecting k-1 groups of training data subsets from the k groups of training data subsets and regarding the same as a current training data set;

computing, according to the current training data set, m evaluation indices for a plurality of features;

ranking the plurality of features according to each evaluation index to obtain m groups of index ranks of the plurality of features;

training a machine learning model on the basis of the current training data set to predict a group of importance ranks of the plurality of features;

fusing k*m groups of index ranks and k groups of importance ranks obtained after k times of execution to obtain total ranks of the plurality of features;

selecting target features from the plurality of features according to the total ranks.

In the third aspect, a feature selection device for constructing a machine learning model is provided, including:

an obtaining unit configured to obtain a training data set;

a division unit configured to divide, in a preset division manner, the training data set obtained by the obtaining unit to obtain k groups of training data subsets;

an execution unit configured to execute, in parallel, the following processes on the k groups of training data subsets obtained by the division unit for k times:

selecting k-1 groups of training data subsets from the k groups of training data subsets and regarding the same as a current training data set;

computing, according to the current training data set, m evaluation indices for a plurality of to-be-filtered features;

ranking the plurality of features according to each evaluation index to obtain m groups of index ranks of the plurality of features;

training a machine learning model on the basis of the current training data set to predict a group of importance ranks of the plurality of features;

a fusion unit configured to fuse k*m groups of index ranks and k groups of importance ranks obtained by the execution unit after k times of execution to obtain total ranks of the plurality of features;

a selection unit configured to select target features from the plurality of features according to the total ranks obtained by the fusion unit.

In the fourth aspect, a feature selection apparatus for constructing a machine learning model is provided, including:

a memory;

one or more processors; and one or more programs, wherein the one or more programs are stored in the memory and are configured to be executed by the one or more processors, and the program is executed by the processor to implement the following steps:

obtaining a training data set;

dividing the training data set in a preset division manner to obtain k groups of training data subsets;

executing, in parallel, the following processes on the k groups of training data subsets for k times:

selecting k-1 groups of training data subsets from the k groups of training data subsets and regarding the same as a current training data set;

computing, according to the current training data set, m evaluation indices for a plurality of to-be-filtered features;

ranking the plurality of features according to each evaluation index to obtain m groups of index ranks of the plurality of features;

training a machine learning model on the basis of the current training data set to predict a group of importance ranks of the plurality of features;

fusing k*m groups of index ranks and k groups of importance ranks obtained after k times of execution to obtain total ranks of the plurality of features;

selecting target features from the plurality of features according to the total ranks.

One or more embodiments of the present application provide a feature selection method, device and apparatus for constructing a machine learning model. A training data set is obtained. The training data set is divided in a preset division manner to obtain k groups of training data subsets. The following processes are executed, in parallel, on the k groups of training data subsets for k times: selecting k-1 groups of training data subsets from the k groups of training data subsets and regarding the same as a current training data set; computing, according to the current training data set, m evaluation indices for a plurality of to-be-filtered features; ranking the plurality of features according to each evaluation index to obtain m groups of index ranks of the plurality of features; training a machine learning model on the basis of the current training data set to predict a group of importance ranks of the plurality of features; fusing k*m groups of index ranks and k groups of importance ranks obtained after k times of execution to obtain total ranks of the plurality of features; and selecting target features from the plurality of features according to the total ranks. Accordingly, it can be seen that after the k group of training data subsets are obtained by division, the selection of the current training data set, the index ranks of the plurality of features, and the importance ranks are executed in parallel for k times. Therefore, the comprehensive performance of the plurality of features in each group of training data subsets can be considered, and thus more accurate features can be obtained by filtering. In addition, the feature selection method provided by the present application also comprehensively considers a plurality of evaluation indices of each feature, and thus filtering can be performed to obtain more stable and more effective features.

BRIEF DESCRIPTION OF THE DRAWINGS

To describe the technical solutions of the embodiments of the specification more clearly, the following briefly introduces the accompanying drawings for describing the embodiments. It is apparent that the accompanying drawings described below are only a part of the embodiments of the specification, and those of ordinary skill in the art may still derive other drawings from these accompanying drawings without creative efforts.

DETAILED DESCRIPTION OF THE EMBODIMENTS

The solutions provided by the specification are described below with reference to the accompanying drawings.

Before introducing a feature selection method for constructing a machine learning model provided by one or more embodiments of the present application, the invention concept of the method will be firstly described below.

Regarding the aspect of dividing a training data set, in the traditional technology, the total training data set are firstly divided into a plurality of groups. After that, several groups of training data sets are selected from the plurality of groups, and features are selected on the basis of the several groups of training data sets. Accordingly, it can be seen that the feature selection method only considers the performance of the features in part of the training data sets, and does not considers the comprehensive performance of the features in each training data set. Therefore, features selected using this feature selection method are generally not stable enough.

In order to improve the stability of the selected features, a solution provided by the present application (referred to as this solution) may borrow from the practice of k-fold Cross Validation. The main idea of k-fold Cross Validation is as follows: an initial sample is divided into k sub-samples, one single sub-sample is reserved as data for validating the model, and the other k-1 sub-samples are used for training. Cross validation is repeated for k times, each sub-sample validates once, and results of the k times are averaged or other combination methods are used to obtain a single estimation. Since the purpose of this solution is to select features, not to train a model, this solution may only adopt the sample division idea and the idea of repeating for k times of k-fold Cross Validation. Specifically, a training data set may be divided into k groups, and then the steps of selecting training data subsets from the k groups and performing feature ranking are executed for k times, in which k-1 groups of training data subsets are selected each time.

For example, assuming that k is 4 and divided four groups of training data subsets are training subsets 1-4. Then, the training data subsets selected for the first time may be training subset 2-4, and training subset 1 is used as a test set; the training data subsets selected for the second time may be training subset 1 and training subsets 3-4, and training subset 2 is used as a test set; the training data subsets selected for the third time may be training subsets 1-2 and training subset 4, and training subset 3 is used as a test set; the training data subsets selected for the fourth time may be training subsets 1-3, and training subset 4 is used as a test set.

It should be noted that after the k groups of training data subsets are obtained by division, each group of training data subset can be selected when the step of selecting the training data subsets is executed for k times. In other words, the comprehensive performance of a plurality of features in each group of training data subset can be considered, and thus more accurate features can be obtained by filtering.

In addition, according to the content of the background, it can be seen that a filter-based feature selection method may be used to filter the features. Filter-based feature selection is mainly to compute a certain evaluation index of each feature on the basis of the training data set, and then filter the features on the basis of the evaluation index. However, when feature selection is performed on the basis of only one evaluation index, usually the selected features are not stable enough. Therefore, this solution will comprehensively consider a plurality of evaluation indices of each feature.

It should be noted that the above evaluation indices may include, but are not limited to, information value (IV), Gini coefficient GINI, information gain (IG), mutual information (MI), Relief score, sample stability index (PSI), etc. It should be noted that the computation methods of the above evaluation indices are traditional conventional technologies, which will not be repetitively described here.

Finally, it should be noted that, when this solution is implemented once, one time of feature filtering can be completed. When the number of to-be-filtered features is large, it is usually necessary to iteratively execute the feature selection process for many times (or rounds), that is to say, this solution needs to be executed multiple times to avoid missing a part of important features when the feature filtering is completed at one time. Specifically, a certain number of features may be eliminated in each feature selection process. Regarding the feature elimination, a reference may be made to the idea of Recursive Feature Elimination. The core idea of Recursive Feature Elimination is as follows: at the first round: a model is trained on the basis of all features to obtain the importances of all features. At the next round, the feature with the least importance is reduced, the model is trained continuously on the basis of the remaining features to obtain importances of the remaining features. After that, one feature with the least importance is reduced from the remaining features, and so on until a specified number of features are obtained through filtering. It can be understood that when the total number of features is 100 and the specified number is 50, it is necessary to execute the above model training process for 50 rounds.

However, when the number of to-be-filtered features filtering is usually tens of thousands and the specified number may be several hundred, it will consume a lot of computing resources to adopt the above method of eliminating only one feature per round. Therefore, in this solution, in order to reduce the consumption of computing resources, N (e.g., 10) unimportant features may be eliminated after each round of model training. Taking N=10 as an example, only five rounds of model training are needed for the above example. It should be noted that, although the number of features eliminated in each round is increased, the accuracy and stability of the features selected by adopting this solution will not be affected since the selection of training data subsets and feature ranking are executed in parallel for k times in each round of feature selection.

Figure 1:
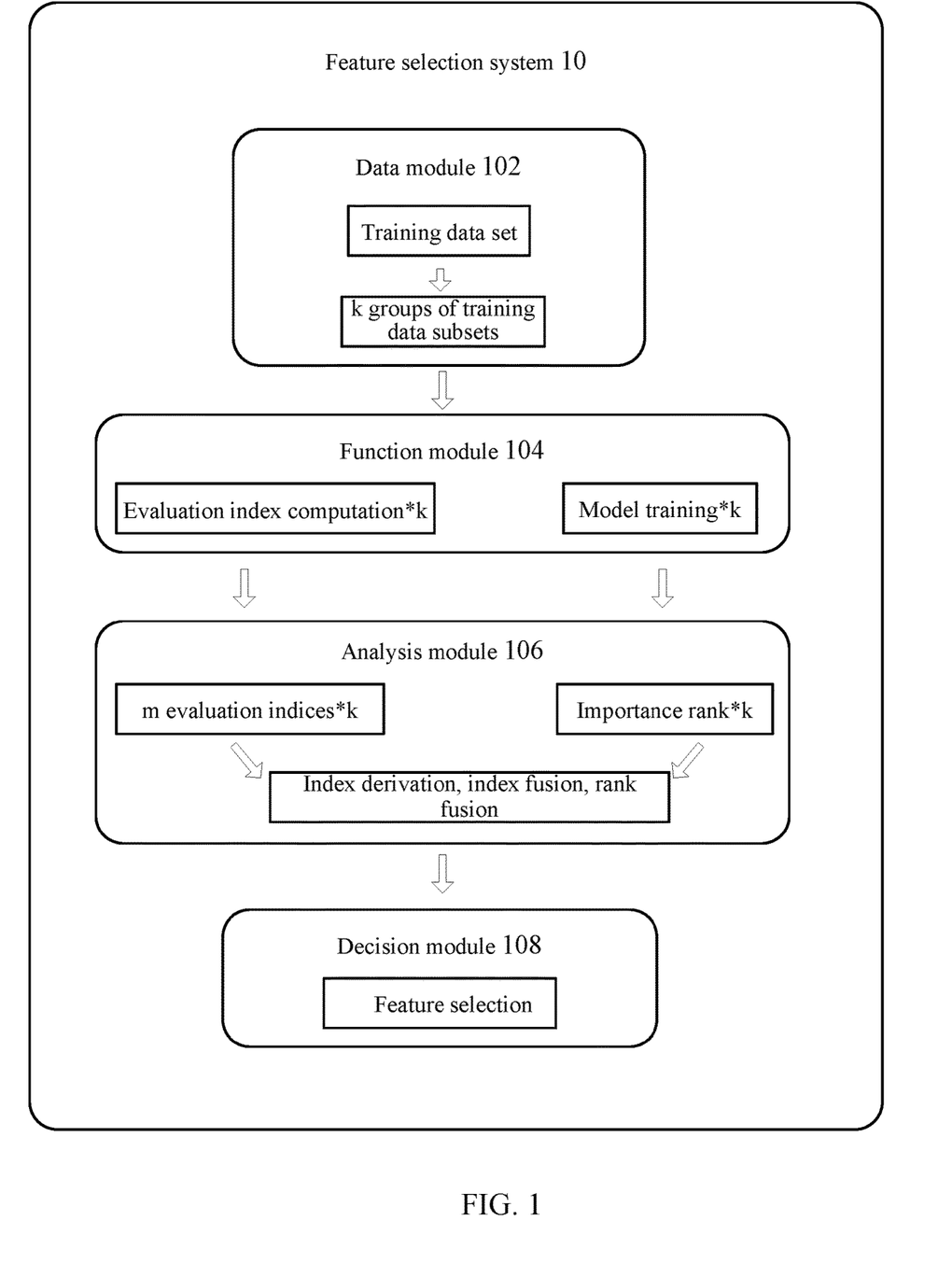
FIG. 1 is a schematic diagram of a feature selection system provided by the present application.

The above is the invention concept of the solution provided by the present application. Based on the invention concept, the solution provided by the present application can be obtained. The solution provided by the present application will be further described below:

A feature selection method for constructing a machine learning model provided by one or more embodiments of the present application may be applied to a feature selection system 10 illustrated in FIG. 1. In FIG. 1, the feature selection system 10 may include a data module 102, a function module 104, an analysis module 106, and a decision module 108.

Data module 102 is configured to divide, in a preset division manner, a training data set into k groups of training data subsets. The preset division manner may include, but not limited to, time-based division, random division, etc.

Function module 104 is configured to execute the following process for k times: selecting k-1 groups of training data subsets from the k groups of training data subsets; computing m evaluation indices for a plurality of features on the basis of the selected training data subsets; ranking the plurality of features according to each evaluation index to obtain m groups of index ranks of the plurality of features; and training a machine learning model on the basis of the selected training data subsets to predict a group of importance ranks of the plurality of features.

Analysis module 106 is configured to fuse the index ranks and the importance rank of each feature. Specifically, k*m groups of index ranks and k groups of importance ranks obtained after k times of execution are fused to obtain total ranks of the plurality of features. In addition, according to the evaluation index of each feature computed by function module 104, index derivation and index fusion may be further performed. Index derivation refers to deriving other indices according to the evaluation index obtained through the current computation of a certain feature. For example, the change rate of IV value can be obtained according to k groups of IV values of a certain feature. Index fusion refers to fusing a plurality of evaluation indices of a certain feature. For example, k groups of IV values of a certain feature are fused to obtain one IV value. The fusion process here may refer to taking the maximum, minimum and average value of the k groups of IV values.

Decision module 108 is configured to select target features from the plurality of features according to the total rank of each feature. Of course, in practical applications, other configuration information may also be combined to select target features. The configuration information here may include pre-configured variable information (e.g., metadata and classification of variables), filtering conditions (e.g., IV>0.01, MAX_PSI<0.25, TOP_N=100), etc. It should be noted that the variable information configured here is used to facilitate the configuration of subsequent fine filtering conditions. In addition, the selection mode of the above features may include, but are not limited to, the following two: direct elimination and iterative elimination. Direct elimination refers to directly eliminating features that do not meet the conditions at one time according to hard conditions, thus filtering out target features that meet the requirements. Iterative elimination refers to iteratively executing the feature filtering process for many times or rounds, so as to eliminate N unimportant features in each round of feature filtering.

Figure 2:
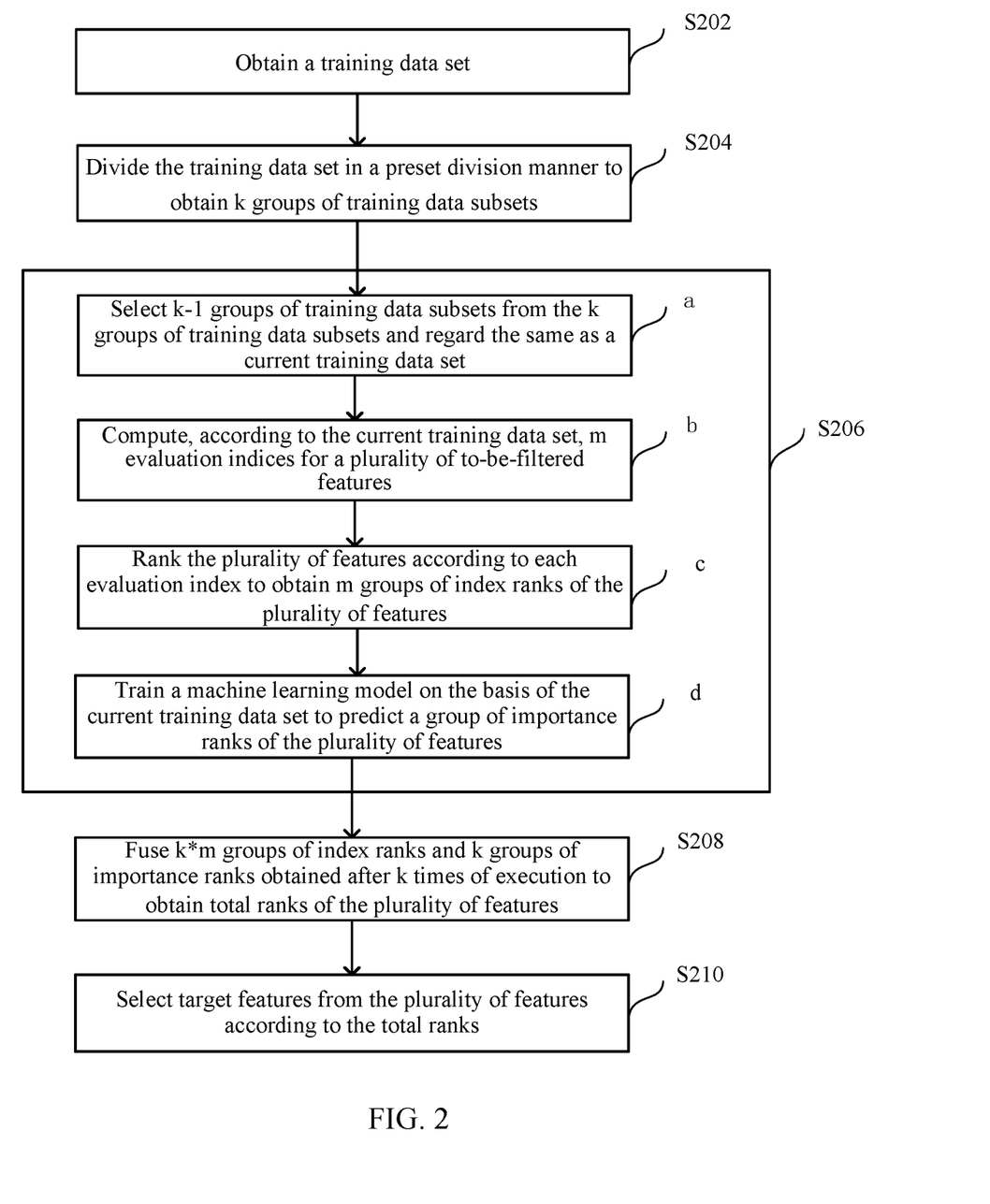
FIG. 2 is a flowchart of a feature selection method for constructing a machine learning model provided by one embodiment of the present application.

FIG. 2 is a flowchart of a feature selection method for constructing a machine learning model provided by one embodiment of the present application. An execution subject of the method may be the feature selection system in FIG. 1. Referring to FIG. 2, the method specifically may include the following steps:

Step 202, obtaining a training data set.

Taking the to-be-constructed machine leaning model being a risk control model (a model for identifying and preventing risks of embezzlement, fraud, and cheating) as an example, the training data set here may be a plurality of user transaction records, and the transaction records may include information such as user information, transaction amount, transaction time, etc. In addition, the training data set here may be a training data set after filtering.

Step 204, dividing the training data set in a preset division manner to obtain k groups of training data subsets.

Here, k may be a positive integer greater than 1. The preset division manner may include, but are not limited to, time-based division, random division, etc. Taking the time-based division manner as an example, assuming that the record time of the training data in the training data set is 2017.1.1-2017.1.30, when k is 3, the training data of 2017.1.1-2017.1.10 may be divided into a first group; the training data of 2017.1.11-2017.1.20 may be divided into a second group; the training data of 2017.1.21-2017.1.30 may be divided into a third group.

It should be noted that the above steps 202 and 204 may be executed by data module 102.

Step 206, executing, in parallel, step a-step d k times.

Step a, selecting k-1 groups of training data subsets from the k groups of training data subsets to be used as a current training data set. The current training data set is also referred to as a feature-selecting data set, as it is used for selecting features. The number of training data subsets can be different from k-1, as long as it is smaller than k. In other words, the feature-selecting data set can be a subset of the training data set. The number of feature-selecting data sets being processed in parallel can be same as or different from k, as long as all training data subsets are included in the various feature-selecting sets used in feature selection.

In the above example, two groups of training data subsets may be selected as the current training data set. It should be noted that each group of training data subset can be selected when the step of selecting the training data subsets is executed for k times. In other words, the comprehensive performance of a plurality of features in each group of training data subset can be considered, and thus more accurate features can be obtained by filtering.

Step b, computing m evaluation indices for a plurality of to-be-filtered features according to the current training data set.

The plurality of to-be-filtered features may be preset by data analysts and data mining engineers on the basis of service experience and understanding of the data. For example, the features may be identity information of the user, number of transactions by the user in several past days, etc.

The above evaluation indices may be used to represent the absolute importance of features, and are unrelated with other features. They may include, but are not limited to, IV, GINI, IG, MI, Relief score, PSI, etc. In the present embodiment, m evaluation indices may be statistically computed, where m is a positive integer. The stability and effectiveness of the filtered target features can be guaranteed by comprehensively considering a plurality of evaluation indices of each feature.

Taking as an example that the to-be-filtered features are: features 1-3, and the evaluation indices are: IV, GINI, and IG, the computation results of the above three features may be as shown in Table 1.

TABLE 1

| Feature   | CV1_IV  | CV1_GINI  | CV1_IG  |
|-----------|---------|-----------|---------|
| Feature 1 | CV1_IV1 | CV1_GINI1 | CV1_IG1 |
| Feature 2 | CV1_IV2 | CV1_GINI2 | CV1_IG2 |
| Feature 3 | CV1_IV3 | CV1_GINI3 | CV1_IG3 |

It should be noted that the evaluation indices in Table 1 are only computed on the basis of the training data subset selected for one time (expressed as CV1). It can be understood that, when the evaluation index of each feature is computed on the basis of the training data subsets selected for k times, k groups of data as shown in Table 1 may be obtained.

Step c, ranking the plurality of features according to each evaluation index to obtain m groups of index ranks of the plurality of features.

Taking Table 1 as an example, when the features are ranked according to IV, assuming CV1_IV1>CV1_IV2>CV1_IV3, then the reuslt of the training may be: feature 1, feature 2, feature 3. According to the ranking result, a group of index ranks of the plurality of features may be obtained as follow: {1,2,3}, wherein the first digit represents the index rank corresponding to feature 1, the second digit represents the index rank corresponding to feature 2, and so on. Similarly, m groups of index ranks of the plurality of features may be obtained according to m rank indices.

It can be understood that m groups of index ranks can be obtained according to the training data subsets selected for one time. Therefore, k*m groups of index ranks can be obtained when step c is executed for k times. In other words, k*m groups of index ranks can be obtained on the basis of the training data subsets selected for k times.

Step d, training a machine learning model on the basis of the current training data set to predict a group of importance ranks of the plurality of features.

The importance ranks here are obtained on the basis of the relative importance of each feature. Relative importance, as the name suggests, is the importance relative to other features, that is, it is related to other features. Specifically, when the machine learning model is trained, it may be configured that an importance ranking result of the features is output after the model is trained. According to the importance ranking result, a group of importance ranks of the plurality of features can be obtained. For example, assuming that there are three features, i.e., features 1-3, and the importance ranking result of the three features is: feature 2, feature 3, feature 1. According to the importance ranking result, a group of importance ranks of features 1-3 can be obtained as follow: {3,1,2}.

It can be understood that k groups of importance ranks can be obtained after step d is repetitively executed for k times.

It should be noted that, in practical applications, the execution order of the above steps b-c and step d may be interchanged or the steps are executed in parallel, which is not limited by the present application. In addition, the above steps a-d may be executed by function module 104.

Step 208, fusing the k*m groups of index ranks and k groups of importance ranks obtained after k times of execution to obtain total ranks of the plurality of features.

In one implementation mode, k*m groups of index ranks and k groups of importance ranks may be directly fused to obtain total ranks of the plurality of features.

In another implementation mode, k*m groups of index ranks may be firstly fused to obtain total index ranks of the plurality of features. Then, k groups of importance ranks are fused to obtain total importance ranks of the plurality of features. Then, the total index ranks and the total importance ranks are fused to obtain the total ranks of the plurality of features.

The specific process of obtaining the total index ranks may be as follows: extracting k groups of index ranks according to an identical evaluation index from the k*m groups of index ranks; fusing corresponding ranks of each feature in the k groups of index ranks according to a first rank fusion algorithm to obtain a comprehensive index rank of each feature corresponding to the evaluation index; repetitively executing the step of extracting and fusing until m comprehensive index ranks of each feature corresponding to the m evaluation indices are obtained; fuding the m comprehensive index ranks of each feature according to a second rank fusion algorithm to obtain the total index rank of each feature.

Of course, in practical applications, k*m groups of index ranks may be directly fused according to the first rank fusion algorithm, which is not limited in the present application.

The abovementioned first rank fusion algorithm or the second rank fusion algorithm may include, but are not limited to, a mean algorithm, a maximum algorithm, a minimum algorithm, a weighted average algorithm, a robust rank aggregation (RRA) algorithm, etc. It can be understood that the first rank fusion algorithm and the second rank fusion algorithm may be the same or different. In the present application, description is made by taking that the two algorithms are the same and are the mean algorithm as an example.

The following is an example of the processes of obtaining each index rank and the total index rank.

Assuming that there are three features: features 1-3, and three evaluation indices: IV, GINI and IG. In addition, further assuming that k=4, i.e., each feature has four IV values, four GINI values and four IG values. The three comprehensive index ranks of each feature corresponding to the three evaluation indices may be as shown in Tables 2-4.

TABLE 2

| Feature | CV1_IV | CV2_IV | CV3_IV | CV4_IV | Comprehensive IV rank |
|---|---|---|---|---|---|
| Feature 1 | 1 | 3 | 2 | 1 | (1 + 3 + 2 + 1)/4 = 1.75 |
| Feature 2 | 2 | 2 | 3 | 2 | (2 + 2 + 3 + 2)/4 = 2.25 |
| Feature 3 | 3 | 1 | 1 | 3 | (3 + 1 + 1 + 3)/4 = 2 |

In Table 2, taking the second column as an example, the numbers in each row in the second column are used to represent the ranks of each feature obtained after being ordered on the basis of the IV values obtained for CV1. In other words, they represent a group of index ranks of each feature corresponding to the IV values.

TABLE 3

| Feature | CV1_GINI | CV2_GINI | CV3_GINI | CV4_GINI | Comprehensive GINI rank |
|---|---|---|---|---|---|
| Feature 1 | 2 | 3 | 1 | 1 | (2 + 3 + 1 + 1)/4 = 1.75 |
| Feature 2 | 3 | 2 | 2 | 2 | (3 + 2 + 2 + 2)/4 = 2.25 |
| Feature 3 | 1 | 1 | 3 | 3 | (3 + 1 + 1 + 3)/4 = 2 |

In Table 3, taking the second column as an example, the numbers in each row in the second column are used to represent the ranks of each feature obtained after being ordered on the basis of the GINI values obtained for CV1. In other words, they represent a group of index ranks of each feature corresponding to the GINI values.

TABLE 4

| Feature | CV1_IG | CV2_IG | CV3_IG | CV4_IG | Comprehensive IG rank |
|---|---|---|---|---|---|
| Feature 1 | 1 | 1 | 3 | 3 | (1 + 1 + 3 + 3)/4 = 2 |
| Feature 2 | 3 | 2 | 2 | 2 | (3 + 2 + 2 + 2)/4 = 2.25 |
| Feature 3 | 2 | 3 | 1 | 1 | (2 + 3 + 1 + 1)/4 = 1.75 |

In Table 4, taking the second column as an example, the numbers in each row in the second column are used to represent the ranks of each feature obtained after being ordered on the basis of the IG value obtained for CV1. In other words, they represent a group of index ranks of each feature corresponding to the IG values.

After the comprehensive ranks of the above three evaluation indices are obtained, the total index rank of each feature may be obtained, as shown in Table 5.

TABLE 5

| Feature | Comprehensive IV rank | Comprehensive GINI rank | Comprehensive IG rank | Total index rank |
|---|---|---|---|---|
| Feature 1 | 1.75 | 1.75 | 2 | (1.75 + 1.75 + 2)/3 = 1.83 |
| Feature 2 | 2.25 | 2.25 | 2.25 | (2.25 + 2.25 + 2.25)/3 = 2.25 |
| Feature 3 | 2 | 2 | 1.75 | (2 + 2 + 1.75)/3 = 1.92 |

It can be understood that the numbers in columns 2-4 in Table 5 are taken from the computation results in Tables 2-4 respectively.

Similar to the processes of obtaining the above index ranks or total index rank, the importance rank of each feature may also be obtained. Specifically, corresponding ranks of each feature in the k groups of importance ranks may be fused according to a third rank fusion algorithm to obtain a total importance rank of each feature. The third rank fusion algorithm here may be the same as the first rank fusion algorithm or the second rank fusion algorithm mentioned above, which will not be repetitively described here.

Taking the above example as an example, assuming that the third rank fusion algorithm is the mean algorithm, the obtained importance ranks may be as shown in Table 6.

TABLE 6

| Feature | CV1_importance rank | CV2_importance rank | CV2_importance rank | CV4_importance rank | Total importance rank |
|---|---|---|---|---|---|
| Feature 1 | 1 | 1 | 3 | 3 | (1 + 1 + 3 + 3)/4 = 2 |
| Feature 2 | 3 | 2 | 2 | 2 | (3 + 2 + 2 + 2)/4 = 2.25 |
| Feature 3 | 2 | 3 | 1 | 1 | (2 + 3 + 1 + 1)/4 = 1.75 |

In Table 6, taking the second column as an example, the numbers in each row in the second column are used to represent the importance ranks of each features output by a machine learning model after training the machine learning model on the basis of CV1. In other words, they represent a group of importance ranks of each feature.

After the total index rank and the total importance rank of each feature are obtained, the total rank of each feature may be obtained. Specifically, the total index rank and the total importance rank may be fused according to a fourth rank fusion algorithm to obtain the total ranks of the plurality of features. The fourth rank fusion algorithm here may be the same as the first rank fusion algorithm or the second rank fusion algorithm mentioned above, which will not be repetitively described here.

Taking the above example as an example, assuming that the fourth rank fusion algorithm is the mean algorithm, the obtained total ranks may be as shown in Table 7.

TABLE 7

| Feature | Total index rank | Total importance rank | Total rank |
|---|---|---|---|
| Feature 1 | 1.83 | 2 | (1.83 + 2)/2 = 1.915 |
| Feature 2 | 2.25 | 2.25 | (2.25 + 2.25)/2 = 2.25 |
| Feature 3 | 1.92 | 1.75 | (1.92 + 1.75)/2 = 1.835 |

It can be understood that the numbers in columns 2-3 in Table 7 are taken from the computation results in Tables 5-6 respectively.

It should be noted that the above step 208 may be executed by analysis module 106.

Step 210, selecting target features from the plurality of features according to the total ranks.

Taking the total ranking results in Table 7 as an example, if two features are to be selected, feature 1 and feature 2 may be selected, so feature 1 and feature 2 are the selected target features. Of course, feature filtering is performed only on the basis of the ranks. In practical applications, decision module 108 may perform filtering in combination with the pre-configured variable information or filtering conditions.

It can be understood that, when decision module 108 adopts the feature selection mode on the basis of iterative elimination, the above steps 202-210 may be repetitively executed until a specified number of target features are obtained through filtering. N unimportant features are eliminated in each round of feature selection.

Figure 3:
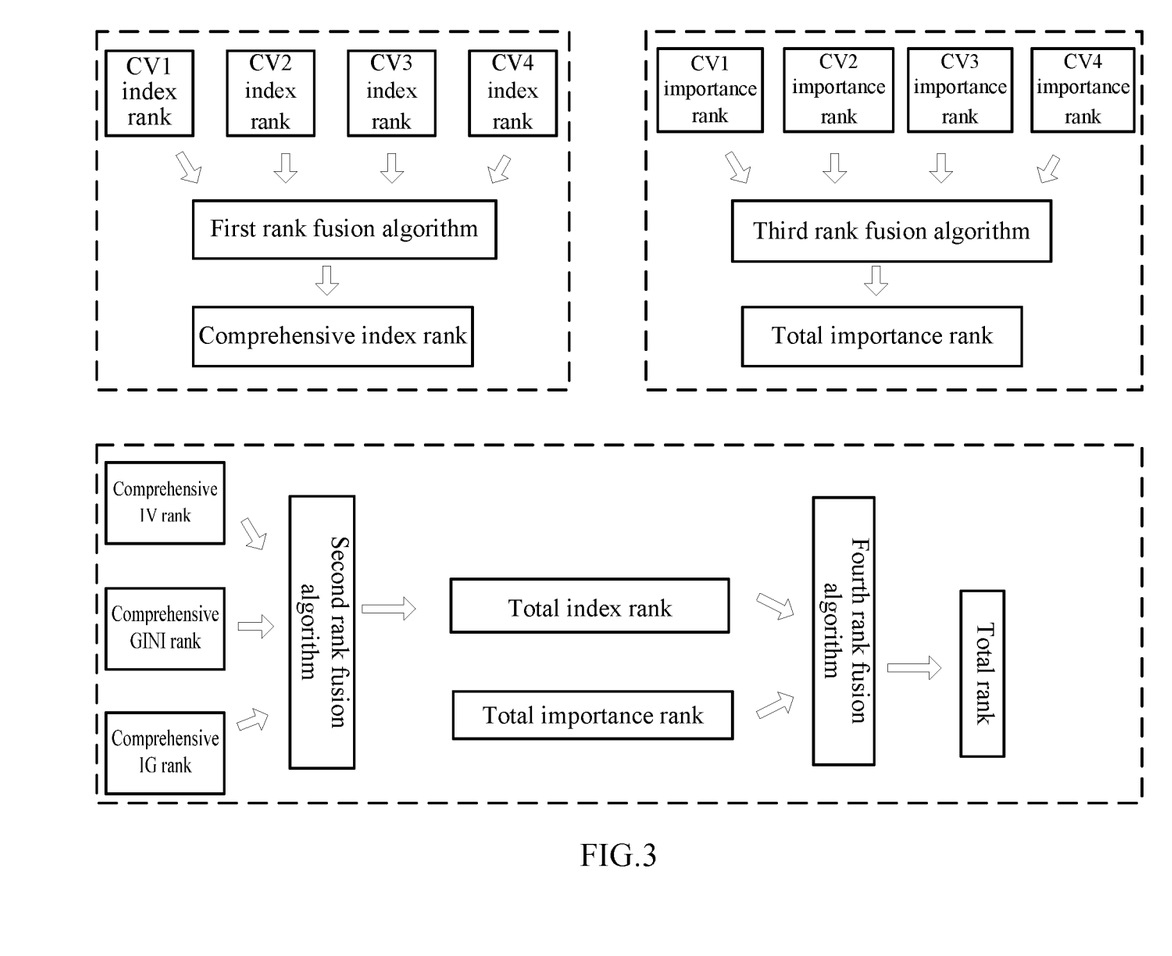
FIG. 3 is a schematic diagram of a feature rank fusion process provided by the present application.

For the specific fusion process in the other implementation mode, a reference may be made to FIG. 3. In FIG. 3, k=4. The top left of FIG. 3 illustrates a fusion process of four groups of index ranks of each feature corresponding to respective evaluation indices (e.g., IV, GINI, IG, etc.), and the finally obtained comprehensive index ranks include comprehensive IV ranks, comprehensive GINI ranks, comprehensive IG ranks, etc. The top right illustrates a fusion process of four groups of importance ranks of each feature, and finally the total importance rank of each feature is obtained. The bottom illustrates that the index ranks of each feature are fused firstly to obtain a total index rank. Then, the total index rank and the total importance rank are fused to obtain the total rank of each feature.

The target features selected in the embodiment of the present application may be used to construct a machine learning model, such as a risk control model (a model for identifying and preventing risks of embezzlement, fraud and cheating).

To sum up, by adopting the feature selection method for constructing the machine learning model provided by the embodiments of the present application, the comprehensive performance of the plurality of features in each group of training data subset can be considered, and thus more accurate features can be obtained by filtering. In addition, the feature selection method provided by the present application also comprehensively considers the absolute importance (such as each evaluation index) and the relative importance of each feature, and thus more stable and more effective features can be obtained by filtering.

Figure 4:
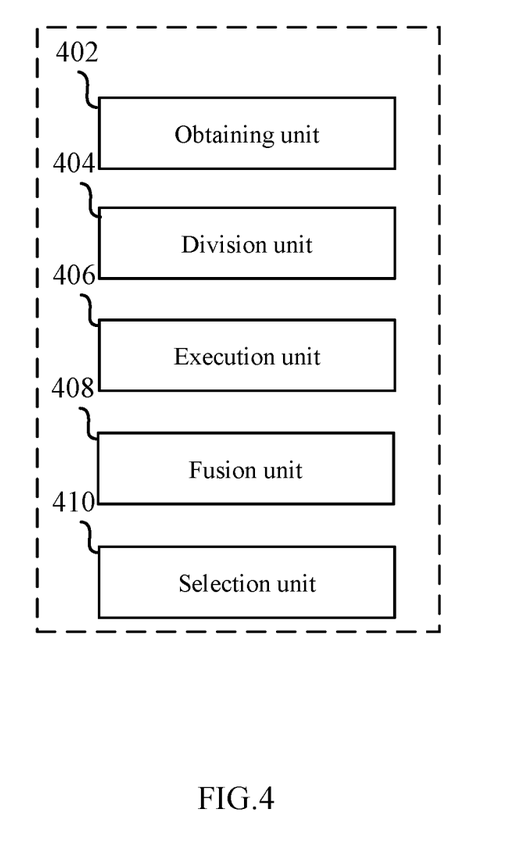
FIG. 4 is a schematic diagram of a feature selection device for constructing a machine learning model provided by one embodiment of the present application.

Corresponding to the feature selection method for constructing the machine learning model, one embodiment of the present application further provides a feature selection device for constructing a machine learning model. As illustrated in FIG. 4, the device may include:

an obtaining unit 402 configured to obtain a training data set;

a division unit 404 configured to divide, in a preset division manner, the training data set obtained by obtaining unit 402 to obtain k groups of training data subsets, wherein the preset division manner here includes any of the following: time-based division manner and random division manner;

an execution unit 406 configured to execute in parallel the following processes on the k groups of training data subsets obtained by division unit 404 for k times:

selecting k-1 groups of training data subsets from the k groups of training data subsets and regarding the same as a current training data set;

computing, according to the current training data set, m evaluation indices for a plurality of to-be-filtered features;

ranking the plurality of features according to each evaluation index to obtain m groups of index ranks of the plurality of features;

training a machine learning model on the basis of the current training data set to predict a group of importance ranks of the plurality of features, wherein the evaluation indices may include several of information value IV, Gini coefficient GINI, information gain IG, mutual information MI, Relief score, and PSI;

a fusion unit 408 configured to fuse k*m groups of index ranks and k groups of importance ranks obtained by execution unit 406 after k times of execution to obtain total ranks of the plurality of features;

a selection unit 410 configured to select target features from the plurality of features according to the total ranks obtained by fusion unit 408.

Optionally, fusion unit 408 may be specifically configured to:

fuse the k*m groups of index ranks to obtain total index ranks of the plurality of features;

fuse the k groups of importance ranks to obtain total importance ranks of the plurality of features;

fuse the total index ranks and the total importance ranks to obtain the total ranks of the plurality of features.

Fusion unit 408 may be further specifically configured to:

extract, from the k*m groups of index ranks, k groups of index ranks obtained according to an identical evaluation index;

fuse corresponding ranks of each feature in the k groups of index ranks according to a first rank fusion algorithm to obtain a comprehensive index rank corresponding to each feature corresponding to the evaluation index;

repetitively execute the above steps of extracting and fusing until m comprehensive index ranks of each feature corresponding to the m evaluation indices are obtained;

fuse the m comprehensive index ranks of each feature according to a second rank fusion algorithm to obtain the total index rank of each feature.

The first rank fusion algorithm or the second rank fusion algorithm here may include any of the following: a mean algorithm, a maximum algorithm, a minimum algorithm, a weighted average algorithm, and a robust rank aggregation (RRA) algorithm.

Fusion unit 408 may be further specifically configured to:

fuse corresponding ranks of each feature in the k groups of importance ranks according to a third rank fusion algorithm to obtain a total importance rank of each feature.

Fusion unit 408 may be further specifically configured to:

fuse the total index ranks and the total importance ranks according to a fourth rank fusion algorithm to obtain the total ranks of the plurality of features. It should be noted that the functions of obtaining unit 402 and division unit 404 may be implemented by data module 102. The function of execution unit 406 may be implemented by function module 104. The function of fusion unit 408 may be implemented by analysis module 106. The function of selection unit 410 may be implemented by decision module 108.

The functions of functional modules of the apparatus in the aforementioned embodiment of the specification can be implemented by the steps in the aforementioned method embodiments. Therefore, a specific operation process of an apparatus provided by an embodiment of the specification will not be described herein again.

The feature selection device for constructing the machine learning model provided by one embodiment of the present application can obtain stable and effective features by filtering.

Figure 5:
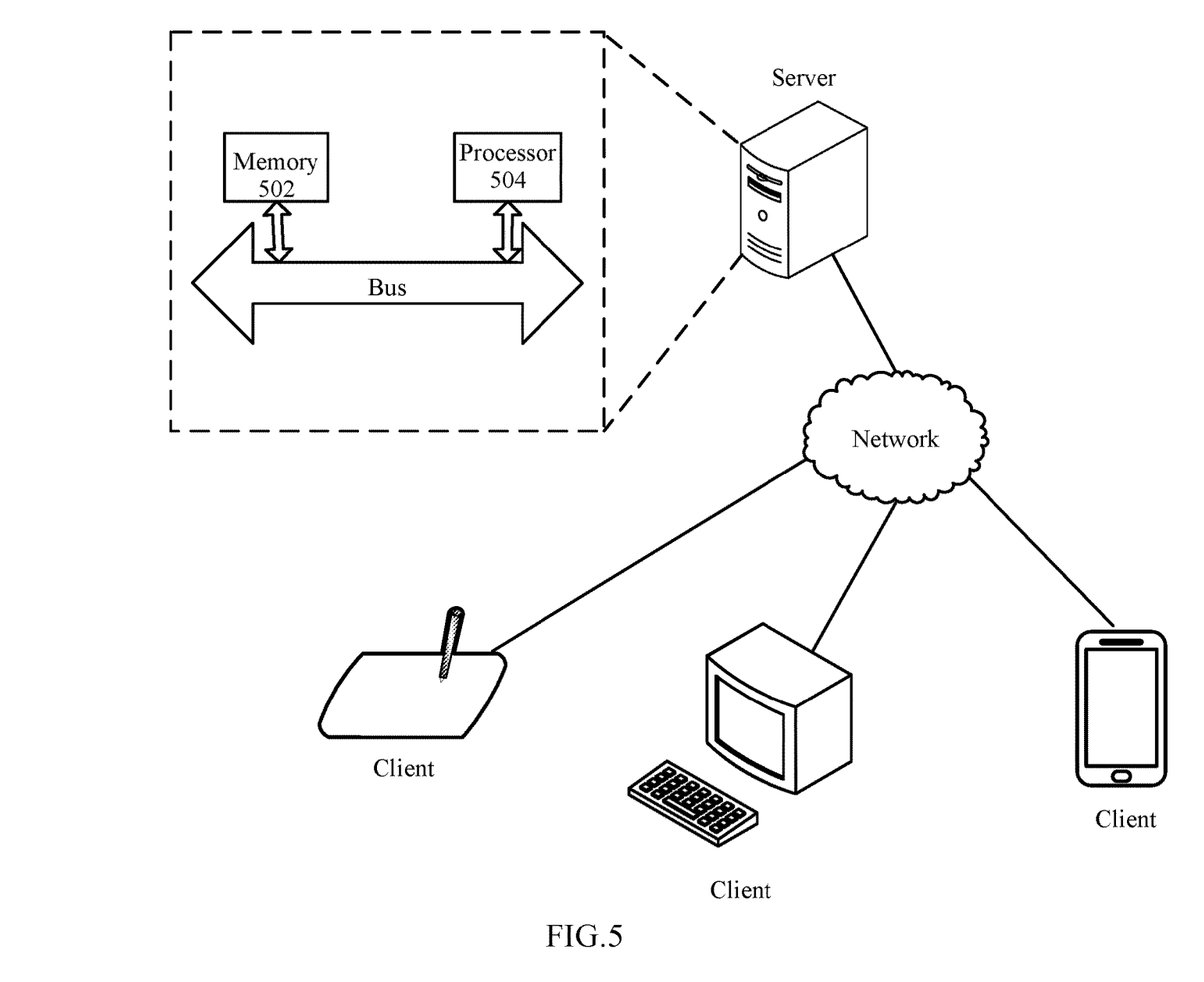
FIG. 5 is a schematic diagram of a feature selection apparatus for constructing a machine learning model provided by one embodiment of the present application.

Corresponding to the feature selection method for constructing the machine learning model, one embodiment of the present application further provides a feature selection apparatus for constructing a machine learning model. As illustrated in FIG. 5, the apparatus may include a memory 502, one or more processors 504, and one or more programs.

The one or more programs are stored in memory 502 and are configured to be executed by the one or more processors 504, and the program is executed by processor 504 to implement the following steps:

obtaining a training data set;

dividing the training data set in a preset division manner to obtain k groups of training data subsets;

executing in parallel the following processes on the k groups of training data subsets for k times:

selecting k-1 groups of training data subsets from the k groups of training data subsets and regarding the same as a current training data set;

computing, according to the current training data set, m evaluation indices for a plurality of to-be-filtered features;

ranking the plurality of features according to each evaluation index to obtain m groups of index ranks of the plurality of features;

training a machine learning model on the basis of the current training data set to predict a group of importance ranks of the plurality of features;

fusing k*m groups of index ranks and k groups of importance ranks obtained after k times of execution to obtain total ranks of the plurality of features;

selecting target features from the plurality of features according to the total ranks.

The feature selection apparatus for constructing the machine learning model provided by one embodiment of the present application can obtain stable and effective features by filtering.

Figure 6:
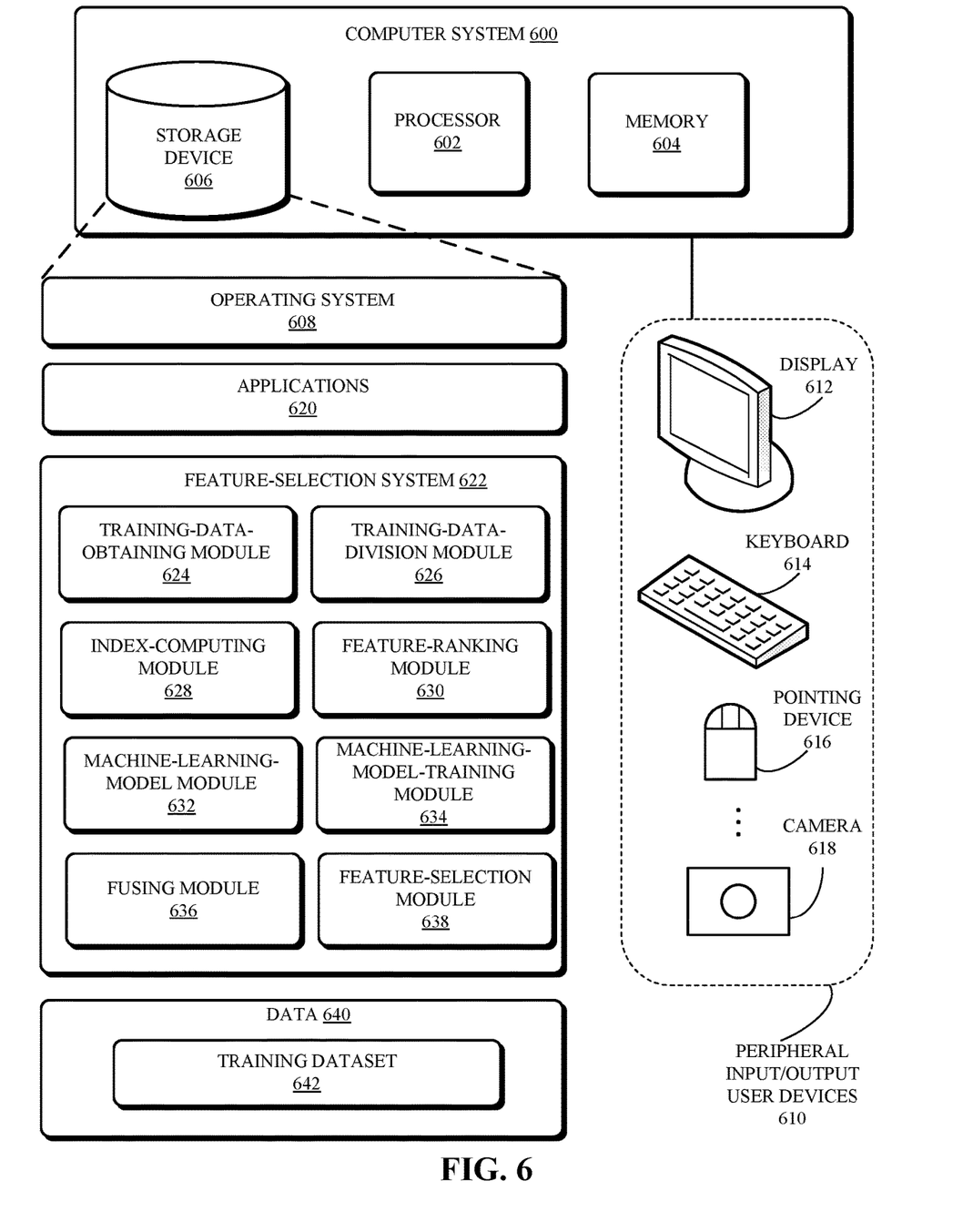
FIG. 6 illustrates an exemplary computer and communication system for feature selection, according to one embodiment.

FIG. 6 illustrates an exemplary computer and communication system for feature selection, according to one embodiment. In FIG. 6, computer system 600 can include a processor 602, a memory 604, and a storage device 606. Furthermore, computer system 600 can be coupled to peripheral input/output (I/O) user devices 610, e.g., a display device 612, a keyboard 614, a pointing device 616, and a camera 618. Storage device 606 can store an operating system 608, one or more applications 620, a feature-selection system 622, and data 640. In one embodiment, computer system 600 can be a mobile terminal device of a user.

Applications 620 can include instructions, which can be loaded from storage device 606 into memory 604 and executed by processor 602. As a result, computer system 600 can perform specific functions provided by applications 620.

Feature-selection system 622 can include instructions, which when executed by computer system 600, can cause computer system 600 or processor 602 to perform methods and/or processes described in this disclosure. Specifically, feature-selection system 622 can include instructions for obtaining training data (training-data-obtaining module 624), instructions for dividing training data into training data subset (training-data-division module 626), instructions for computing evaluation indices for a plurality of features (index-computing module 628), instructions for ranking the plurality of features (feature-ranking module 630), instructions for implementing a machine learning model for predicting importance ranks of features (machine-learning-model module 632), instructions for training the machine learning model for predicting importance ranks of features (machine-learning-model-training module 634), instructions for fusing the index ranks and the importance ranks to obtain a total rank for each feature (fusing module 636), and instructions for selecting target features based on the total ranks of the features (feature-selection module 638).

Data 640 can include a training data set 642.

In some embodiments, applications 620 and the various modules in feature-selection system 622, such as modules 624, 626, 628, 630, 632, 634, 636, and 638 can be partially or entirely implemented in hardware and can be part of processor 602. Further, in some embodiments, the system may not include a separate processor and memory. Instead, in addition to performing their specific tasks, modules 620, 624, 626, 628, 630, 632, 634, 636, and 638, either separately or in concert, may be part of general- or special-purpose computation engines.

Figure 7:
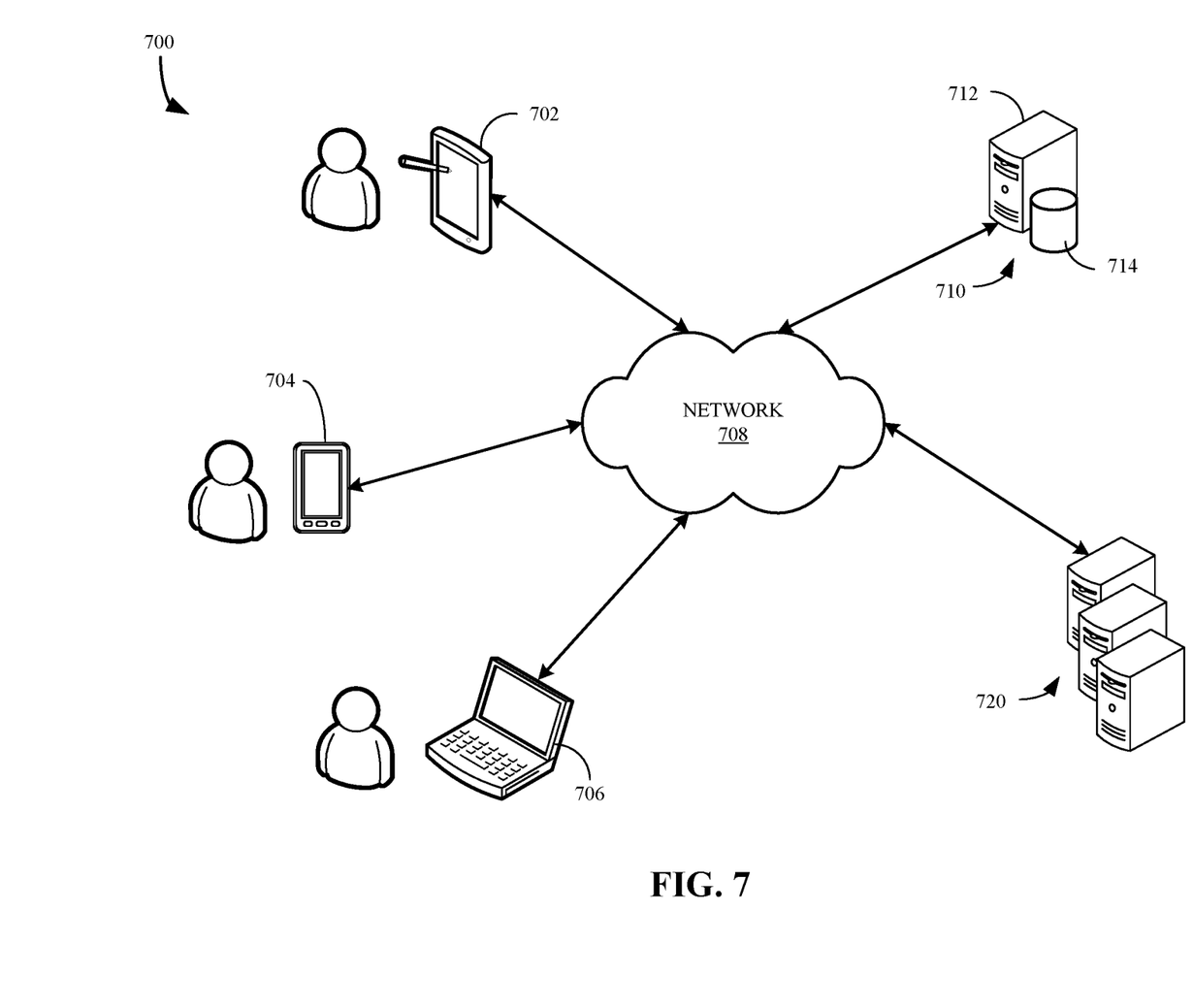
FIG. 7 illustrates an exemplary network environment for implementing the disclosed technology, in accordance with some embodiments described herein.

FIG. 7 illustrates an exemplary network environment for implementing the disclosed technology, in accordance with some embodiments described herein. A network environment 700 includes a number of electronic devices 702, 704 and 706 communicably connected to a server 710 by a network 708. One or more remote servers 720 are further coupled to the server 710 and/or the one or more electronic devices 702, 704 and 706.

In some exemplary embodiments, electronic devices 702, 704 and 706 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 702, 704 and 706 store a user agent such as a browser or application. In the example of FIG. 7, electronic device 702 is depicted as a tablet computer, electronic device 704 is depicted as a smartphone, and electronic device 706 is depicted as a laptop computer.

Server 710 includes a processing device 712 and a data store 714. Processing device 712 executes computer instructions stored in data store 714, for example, to assist in scheduling a customer-initiated service or a service-provider-initiated service between a service provider and a customer at electronic devices 702, 704 and 706 during a service scheduling process.

In some exemplary aspects, server 710 can be a single computing device such as a computer server. In other embodiments, server 710 can represent more than one computing device working together to perform the actions of a server computer (e.g., cloud computing). The server 710 may host the web server communicably coupled to the browser at the client device (e.g., electronic devices 702, 704 or 706) via network 708. In one example, the server 710 may host a client application for scheduling a customer-initiated service or a service-provider-initiated service between a service provider and a customer during a service scheduling process. Server 710 may further be in communication with one or more remote servers 720 either through the network 708 or through another network or communication means.

The one or more remote servers 720 may perform various functionalities and/or storage capabilities described herein with regard to the server 710, either alone or in combination with server 710. Each of the one or more remote servers 720 may host various services. For example, servers 720 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 720 can be a single computing device such as a computer server or can represent more than one computing device working together to perform the actions of a server computer (e.g., cloud computing). In one embodiment server 710 and one or more remote servers 720 may be implemented as a single server or a cluster of servers. In one example, server 710 and one or more remote servers 720 may communicate through the user agent at the client device (e.g., electronic devices 702, 704 or 706) via network 708.

Users may interact with the system hosted by server 710, and/or one or more services hosted by remote servers 720, through a client application installed at the electronic devices 702, 704, and 706. Alternatively, the user may interact with the system through a web-based browser application at the electronic devices 702, 704, and 706. Communication among client devices 702, 704, 706 and the system, and/or one or more services, may be facilitated through a network (e.g., network 708).

Communication among the client devices 702, 704, 706, server 710 and/or one or more remote servers 720 may be facilitated through various communication protocols. In some aspects, client devices 702, 704, 706, server 710 and/or one or more remote servers 720 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 708 can include, for example, any one or more of a personal area network (PAN), a local area network (LAN), a campus area network (CAN), a metropolitan area network (MAN), a wide area network (WAN), a broadband network (BBN), the Internet, and the like. Further, network 708 can include, but is not limited to, any one or more of the following network topologies, including a bus network, a star network, a ring network, a mesh network, a star-bus network, a tree or hierarchical network, and the like.

Each embodiment of the present application is described in a progressive manner, and the same or similar sections between various embodiments are described with reference to each other, each of which is focused on the differences with other embodiments. Especially, the apparatus embodiment is described relatively briefly because it is substantially similar to the method embodiment, and for related parts, a reference may be made to the method embodiment.

The steps of the method or algorithm described in combination with the content disclosed herein may be implemented by means of hardware, or by means of a processor executing software instructions. Software instructions may consist of corresponding software modules, which may be stored in an RAM memory, a flash memory, an ROM memory, an EPROM memory, an EEPROM memory, a register, a hard disk, a mobile hard disk, a CD-ROM or any other form of storage medium well known in the art. An exemplary storage medium is coupled to a processor such that the processor can read information from and write information to the storage medium. Of course, the storage medium may also be part of the processor. The processor and storage medium may be located in an ASIC. In addition, the ASIC may be located in a server. Of course, the processor and storage medium may also exist in the server as discrete components.

Those skilled in the art should be aware that in one or more of the above examples, the functions described in the present application may be implemented by hardware, software, firmware or any combination thereof. When implemented by software, these functions may be stored in a computer-readable medium, or transmitted as one or a plurality of instructions or as one or a plurality of pieces of code in the computer-readable medium. The computer-readable medium includes a computer storage medium and a communication medium, wherein the communication medium includes any medium that facilitates the transmission of computer programs from one place to another. The storage medium may be any available medium that can be accessed by a general-purpose or special-purpose computer.

The foregoing describes specific embodiments of the present application. Other embodiments fall within the scope of the appended claims. In some cases, the actions or steps recited in the claims may be performed in a sequence different from the order in the embodiments and may still achieve the desired result. Further, the processes depicted in the drawings do not necessarily require the particular order or sequential order shown to achieve the desired result. In certain implementations, multitasking and parallel processing is or may be advantageous.

The objectives, the technical solutions, and the beneficial effects of the specification are further described in detail in the foregoing specific implementation. It should be understood that the foregoing descriptions are merely specific implementation of the specification, and are not intended to limit the protection scope of the specification. Any modification, equivalent replacement, and improvement made on the basis of the technical solutions of the specification shall fall within the protection scope of the specification.

What is claimed is:

1. A computer-executed method, comprising:
   obtaining a training data set and features associated with the training data set;
   dividing the training data set into a first number of training data subsets;
   forming a plurality of feature-selecting data sets, wherein a respective feature-selecting data set comprises a second number of training data subsets, the second number being smaller than the first number;
   processing, by a computer in parallel, each feature-selecting data set, which comprises:
      computing a first evaluation index for the features based on the feature-selecting data set;
      obtaining a group of index ranks corresponding to the features based on the first evaluation index; and
      obtaining a group of importance ranks corresponding to the features based on the feature-selecting data set and a machine-learning model;
   obtaining a group of total ranks corresponding to the features by fusing groups of index ranks and groups importance ranks obtained from processing the plurality of feature-selecting data sets; and
   selecting target features from the features based on the group of total ranks.

2. The method according to claim 1, wherein obtaining the group of total ranks of the features comprises:

fusing the groups of index ranks obtained from processing the plurality of feature-selecting data sets to obtain a group of total index ranks;
fusing the groups of importance ranks obtained from processing the plurality of feature-selecting data sets to obtain a group of total importance ranks; and
fusing the group of total index ranks and the group of total importance ranks to obtain the group of total ranks of the plurality of features.

3. The method according to claim 2, wherein processing each feature-selecting data set further comprises:
computing additional evaluation indices for the features based on the feature-selecting data set; and
obtaining additional groups of index ranks corresponding to the features based on the additional evaluation indices.

4. The method according to claim 3, wherein fusing the groups of index ranks to obtain the group of total index ranks of the plurality of features comprises:
for each evaluation index selected from a set of evaluation indices comprising the additional evaluation indices and the first evaluation index:
extracting from groups of index ranks association with the set of evaluation indices and the plurality of feature-selecting data sets, a plurality of groups of index ranks associate with the selected evolution index; and
performing a first rank fusion operation to respectively fuse corresponding ranks of the features in the extracted plurality of groups of index ranks to obtain a group of comprehensive index ranks corresponding to the selected evaluation index; and
performing a second rank fusion operation to respectively fuse groups of index ranks obtained for the set of evaluation indices to obtain the total index ranks of the features.

5. The method according to claim 2, wherein the first rank fusion operation or the second rank fusion operation comprises one of: a mean operation, a maximum operation, a minimum operation, a weighted average operation and a robust rank aggregation (RRA) operation.

6. The method according to claim 1, wherein dividing the training data set comprises one of:
dividing the training data set based on time; and
dividing the training data set randomly.

7. The method according to claim 1, wherein the first evaluation index comprises one of: an information value (IV), a Gini coefficient (GINI), an information gain (IG), mutual information (MI), a Relief score, and a sample stability index (PSI).

8. The method according to claim 1, wherein the training data set is divided into k training data subsets, wherein k different feature-selecting data sets are formed, and wherein each feature-selecting data set comprises k-1 training data subsets.

9. A computer system, comprising:
a processor;
a storage device coupled to the processor and storing instructions, which when executed by the processor cause the processor to perform a method, the method comprising:
obtaining a training data set and features associated with the training data set;
dividing the training data set into a first number of training data subsets;
forming a plurality of feature-selecting data sets, wherein a respective feature-selecting data set comprises a second number of training data subsets, the second number being smaller than the first number;
processing in parallel, each feature-selecting data set, which comprises:
computing a first evaluation index for the features based on the feature-selecting data set;
obtaining a group of index ranks corresponding to the features based on the first evaluation index; and
obtaining a group of importance ranks corresponding to the features based on the feature-selecting data set and a machine-learning model;
obtaining a group of total ranks corresponding to the features by fusing groups of index ranks and groups importance ranks obtained from processing the plurality of feature-selecting data sets; and
selecting target features from the features based on the group of total ranks.

10. The computer system according to claim 9, wherein obtaining the group of total ranks of the features comprises:
fusing the groups of index ranks obtained from processing the plurality of feature-selecting data sets to obtain a group of total index ranks;
fusing the groups of importance ranks obtained from processing the plurality of feature-selecting data sets to obtain a group of total importance ranks; and
fusing the group of total index ranks and the group of total importance ranks to obtain the group of total ranks of the plurality of features.

11. The computer system according to claim 10, wherein processing each feature-selecting data set further comprises:
computing additional evaluation indices for the features based on the feature-selecting data set; and
obtaining additional groups of index ranks corresponding to the features based on the additional evaluation indices.

12. The computer system according to claim 11, wherein fusing the groups of index ranks to obtain the group of total index ranks of the plurality of features comprises:
for each evaluation index selected from a set of evaluation indices comprising the additional evaluation indices and the first evaluation index:
extracting from groups of index ranks association with the set of evaluation indices and the plurality of feature-selecting data sets, a plurality of groups of index ranks associate with the selected evolution index; and
performing a first rank fusion operation to respectively fuse corresponding ranks of the features in the extracted plurality of groups of index ranks to obtain a group of comprehensive index ranks corresponding to the selected evaluation index; and
performing a second rank fusion operation to respectively fuse groups of index ranks obtained for the set of evaluation indices to obtain the total index ranks of the features.

13. The computer system according to claim 10, wherein the first rank fusion operation or the second rank fusion operation comprises one of: a mean operation, a maximum operation, a minimum operation, a weighted average operation and a robust rank aggregation (RRA) operation.

14. The computer system according to claim 9, wherein dividing the training data set comprises one of:
dividing the training data set based on time; and
dividing the training data set randomly.

15. The computer system according to claim 9, wherein the first evaluation index comprises one of: an information value (IV), a Gini coefficient (GINI), an information gain (IG), mutual information (MI), a Relief score, and a sample stability index (PSI).

16. The computer system according to claim 9, wherein the training data set is divided into k training data subsets, wherein k different feature-selecting data sets are formed, and wherein each feature-selecting data set comprises k-1 training data subsets.

17. A non-transitory computer-readable storage medium storing instructions that when executed by a computer cause the computer to perform a method, the method comprising:
 obtaining a training data set and features associated with the training data set;
 dividing the training data set into a first number of training data subsets;
 forming a plurality of feature-selecting data sets, wherein a respective feature-selecting data set comprises a second number of training data subsets, the second number being smaller than the first number;
 processing, in parallel, each feature-selecting data set, which comprises:
  computing a first evaluation index for the features based on the feature-selecting data set;
  obtaining a group of index ranks corresponding to the features based on the first evaluation index; and
  obtaining a group of importance ranks corresponding to the features based on the feature-selecting data set and a machine-learning model;
 obtaining a group of total ranks corresponding to the features by fusing groups of index ranks and groups importance ranks obtained from processing the plurality of feature-selecting data sets; and
 selecting target features from the features based on the group of total ranks.

18. The non-transitory computer-readable storage medium according to claim 17, wherein obtaining the group of total ranks of the features comprises:
 fusing the groups of index ranks obtained from processing the plurality of feature-selecting data sets to obtain a group of total index ranks;
 fusing the groups of importance ranks obtained from processing the plurality of feature-selecting data sets to obtain a group of total importance ranks; and
 fusing the group of total index ranks and the group of total importance ranks to obtain the group of total ranks of the plurality of features.

19. The non-transitory computer-readable storage medium according to claim 18, wherein processing each feature-selecting data set further comprises:
 computing additional evaluation indices for the features based on the feature-selecting data set; and
 obtaining additional groups of index ranks corresponding to the features based on the additional evaluation indices.

20. The non-transitory computer-readable storage medium according to claim 19, wherein fusing the groups of index ranks to obtain the group of total index ranks of the plurality of features comprises:
 for each evaluation index selected from a set of evaluation indices comprising the additional evaluation indices and the first evaluation index:
  extracting from groups of index ranks association with the set of evaluation indices and the plurality of feature-selecting data sets, a plurality of groups of index ranks associate with the selected evolution index; and
  performing a first rank fusion operation to respectively fuse corresponding ranks of the features in the extracted plurality of groups of index ranks to obtain a group of comprehensive index ranks corresponding to the selected evaluation index; and
 performing a second rank fusion operation to respectively fuse groups of index ranks obtained for the set of evaluation indices to obtain the total index ranks of the features.

21. The non-transitory computer-readable storage medium according to claim 18, wherein the first rank fusion operation or the second rank fusion operation comprises one of: a mean operation, a maximum operation, a minimum operation, a weighted average operation and a robust rank aggregation (RRA) operation.

22. The non-transitory computer-readable storage medium according to claim 17, wherein dividing the training data set comprises one of:
 dividing the training data set based on time; and
 dividing the training data set randomly.

23. The non-transitory computer-readable storage medium according to claim 17, wherein the first evaluation index comprises one of: an information value (IV), a Gini coefficient (GINI), an information gain (IG), mutual information (MI), a Relief score, and a sample stability index (PSI).

24. The non-transitory computer-readable storage medium according to claim 17, wherein the training data set is divided into k training data subsets, wherein k different feature-selecting data sets are formed, and wherein each feature-selecting data set comprises k-1 training data subsets.

* * * * *